United States Patent
Yang et al.

(10) Patent No.: US 12,384,390 B2
(45) Date of Patent: Aug. 12, 2025

(54) PATH PLANNING DURING STEER-BY-BRAKE OR STEER-BY-TORQUE VECTORING

(71) Applicant: Volvo Car Corporation, Gothenburg (SE)

(72) Inventors: Derong Yang, Gothenburg (SE); Mats Jonasson, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 145 days.

(21) Appl. No.: 18/303,745

(22) Filed: Apr. 20, 2023

(65) Prior Publication Data
US 2023/0339482 A1    Oct. 26, 2023

(30) Foreign Application Priority Data

Apr. 21, 2022  (EP) ................................. 22169309

(51) Int. Cl.
*B60W 50/02*  (2012.01)
*B60W 30/18*  (2012.01)

(52) U.S. Cl.
CPC .. *B60W 50/0225* (2013.01); *B60W 30/18145* (2013.01); *B60W 2510/20* (2013.01); *B60W 2510/22* (2013.01)

(58) Field of Classification Search
CPC ....... B60W 50/0225; B60W 30/18145; B60W 2510/20; B60W 2510/22
See application file for complete search history.

(56) References Cited

U.S. PATENT DOCUMENTS 8,195,371 B2 * 6/2012 Yasui .................. B60W 40/076
                                                   701/72
9,085,301 B2 * 7/2015 Taguchi .............. B60W 30/143
(Continued)

FOREIGN PATENT DOCUMENTS

CN        111717278 B  *  4/2022   ............ B60W 50/00
DE    102018220510 A1      5/2020
(Continued)

OTHER PUBLICATIONS

"Jonasson, M et. al.; Steering Redundancy for Self-Driving Vehicles using Differential Braking; Apr. 2017; Volvo Cars, Active Safety and Vehicle Dynamics Functions, Gothenburg, SE-405 31, Sweden" (Year: 2017).*

(Continued)

*Primary Examiner* — Peter D Nolan
*Assistant Examiner* — Christopher R Cardimino
(74) *Attorney, Agent, or Firm* — Amin, Turocy & Watson, LLP

(57) ABSTRACT

A computer-implemented method for providing control data for at least one driver support system of a vehicle, or for at least one driving assistance system of the vehicle for supporting driving of the vehicle on a desired path through a curvature planning and steering, can comprise: obtaining suspension data of the vehicle, obtaining vehicle data of the vehicle, obtaining vehicle driving sensor data of the vehicle, determining a steering angle data based on the suspension data, the vehicle data, and the vehicle driving sensor data, and determining the control data for the at least one driver support system or the at least one driving assistance system based on the steering angle data and a curvature vehicle model.

23 Claims, 5 Drawing Sheets

(56) References Cited

U.S. PATENT DOCUMENTS

| | | | |
|---|---|---|---|
| 10,046,743 B2* | 8/2018 | Jonasson | B62D 9/005 |
| 11,847,836 B2* | 12/2023 | Schofield | G06V 20/584 |
| 2012/0283907 A1* | 11/2012 | Lee | B60T 8/17557 |
| | | | 701/32.9 |
| 2013/0218396 A1* | 8/2013 | Moshchuk | G08G 1/165 |
| | | | 701/25 |
| 2018/0202544 A1* | 7/2018 | Okubo | F16H 61/12 |
| 2020/0108839 A1* | 4/2020 | Moran | B60T 8/1755 |
| 2020/0207412 A1* | 7/2020 | Al Assad | B62D 15/0245 |
| 2020/0406912 A1 | 12/2020 | Stein et al. | |
| 2022/0009487 A1* | 1/2022 | Belle | B60W 30/146 |
| 2022/0111895 A1* | 4/2022 | Schumann | B60W 40/114 |
| 2022/0315100 A1* | 10/2022 | Shimizu | B60W 50/029 |

FOREIGN PATENT DOCUMENTS

| | | | |
|---|---|---|---|
| EP | 2623386 A1 | | 8/2013 |
| EP | 3090907 A1 | | 11/2016 |
| JP | 2015074425 A | * | 4/2015 |
| WO | 2019/072379 A1 | | 4/2019 |

OTHER PUBLICATIONS

"Tian, J. et. al.; Integrated Control With DYC and DSS for 4WID Electric Vehicles; Aug. 27, 2019; IEEE; vol. 7, 2019" (Year: 2019).*

European Search Report dated Sep. 16, 2022 for EP Patent Application EP22169309.6 filed Apr. 21, 2022, 8 pages.

Communication Pursuant to Article 94(3) EPC received for EP Patent Application Serial No. 22169309.6 dated Mar. 5, 2024, 5 pages.

* cited by examiner

PATH PLANNING DURING STEER-BY-BRAKE OR STEER-BY-TORQUE VECTORING

CROSS-REFERENCE TO RELATED APPLICATIONS

This application claims the benefit of and priority to pending EP patent application serial number 22169309.6, filed Apr. 21, 2022, and entitled "PATH PLANNING DURING STEER-BY-BRAKE OR STEER-BY-TORQUE VECTORING," the entirety of which is hereby incorporated by reference herein.

TECHNICAL FIELD

The present disclosure relates to providing control data for at least one driver support system of a vehicle and/or for at least one driving assistance system of a vehicle and, more particularly, to path planning during steer-by-brake or steer-by-torque vectoring.

BACKGROUND

Friction brakes or torque vectoring may be applied to a vehicle as a back-up in case of a steering actuator fault of a vehicle, in which a risk to the vehicle is not being able to steer any longer. Friction brakes or torque vectoring may generate forces in the wheel suspension and turn the front wheels. Hence, brakes and torque vectoring may be considered as redundant steering actuators. However, the steering capability may be reduced when brakes or torque vectoring are applied, due to limited actuator capability as well as vehicle stability constraints, which may risk to result in road departure if there happen to be a bad combination of speed and curvature. Further, in a fault situation of an electric power steering assistance system (EPAS) on board, a driver has to apply more torque to the steering wheel, which may be applied too late or not sufficiently. Moreover, a fall back system for autonomous driving mode, in case of the use of a steer-by-wire technique in which no mechanical connection (e.g., steering column) exists between hand wheel and road wheel, does not exist. So, if steer-by-wire fails, a loss of steering control can occur.

SUMMARY

Embodiments herein provide a method for providing control data for at least one driver support system of a vehicle and/or for at least one driving assistance system of a vehicle at least for the above-mentioned situations.

It is thus an object of the present disclosure to provide a computer-implemented method for providing control data for at least one driver support system of a vehicle.

These and other objects, which become apparent upon reading the following description, are solved by embodiments described herein.

A first aspect of the present disclosure relates to a computer-implemented method for providing control data for at least one driver support system of a vehicle and/or for at least one driving assistance system of a vehicle for supporting the driving of the vehicle on a desired path through a curvature planning and steering, comprising:
  obtaining suspension data of the vehicle;
  obtaining vehicle data of the vehicle;
  obtaining vehicle driving sensor data of the vehicle;
  determining a steering angle data based on the suspension data, the vehicle data, and the vehicle driving sensor data; and
  determining control data for at least one driver support system and/or driving support system based on the steering angle data and a curvature vehicle model.

In other words, the present disclosure provides a curvature capability, especially for self-driving vehicles, to follow a desired path ahead the vehicle along with a desired vehicle speed profile. The computer-implemented method may be capable to compute the maximum speed ahead so that the vehicle may be able to follow a desired path, and/or if a high curvature occurs. The information about the maximum speed may be used for planning the motion and this information may be used to plan the vehicle speed early and to be able to drive around curves due to using individual brakes or torque vectoring in case a steering system failure occurs. Hence, a selection of route and speed profile may be determined to be able to handle a steering failure. The steering angle data may be obtained by the at least one driver support system, the at least one driving assistance system and/or sensor or sensor-system of the vehicle. Further, the steering angle data may comprise differential torque data of the vehicle, which may comprise information of the vehicle of its actual track and/or speed. The curvature vehicle model may comprise the steady-state vehicle model. Furthermore, the control data may comprise information to re-plan a path of the vehicle regarding differential torque data of the vehicle and the curvature vehicle model.

Notably, any disclosure and implementations described herein can relate to the methods and/or the apparatuses/units/devices, outlined above or below and vice versa. The benefits provided by any of the aspects, implementations and examples can equally apply to all other aspects, implementations and/or examples, and vice versa.

As used herein "determining" also includes "initiating or causing to determine", "generating" also includes "initiating and/or causing to generate" and "providing" also includes "initiating or causing to determine, generate, select, send and/or receive". "Initiating or causing to perform an action" includes any processing signal that triggers a computing node or device to perform the respective action.

In an implementation, the method may comprise a determining of a maximum speed data of the desired path through a curvature at which the vehicle can follow the desired path through a curvature, in particular during a steering system failure. The control data may comprise the maximum speed data of the desired path through a curvature at which the vehicle can follow the desired path through a curvature. Further the maximum speed data may be determined regarding the feasibility to negotiate a high curvature.

In an implementation, the suspension data may comprise wheel scrub radius data (R_scrub) of at least one wheel of the vehicle, wheel torque data (DiffTq) of at least one wheel of the vehicle and/or cornering stiffness data (CornrgStfn-Frnt) of at least one axis, in particular the front axis, of the vehicle.

In an implementation, the vehicle data may comprise wheel data (WhlRd) of at least one wheel of the vehicle, caster trail data (R_caster) of the vehicle and/or center of gravity data (Lf) of the vehicle.

In an implementation, the vehicle driving sensor data may comprise a vehicle speed data (Vx) of the vehicle, yaw rate data (yawrate) of the vehicle and/or vehicle steer-ratio data (steerratio) of the vehicle.

In an implementation, the control data may comprise a steer-by-torque vectoring value to use a steer-by-torque vectoring method for steering the vehicle and/or the control data may comprise a steer-by-brake vectoring value to use a steer-by-brake vectoring method for steering the vehicle. The steer-by-torque vectoring method may be used to control at least one wheel of the vehicle. The steer-by-brake vectoring method may be used to control at least one wheel of the vehicle.

In an implementation, determining of the steering angle data may result from differential torque of the vehicle, which may be based on the formula:

$$\frac{\frac{R_{scrub} * DiffTq}{WhlRd}}{CornrgStfnFrnt * R_{caster}} + \frac{Lf * \text{yaw rate}}{Vx * \text{steer ratio}}$$

whereby:
Rscrub is wheel scrub radius data;
DiffTq is wheel torque data;
CornrgStfnFrnt is cornering stiffness data;
WhlRd is wheel data;
Rcaster is caster trail data;
Lf is center of gravity data;
Vx is vehicle speed data;
yawrate is yaw rate data; and/or
steeratio is vehicle steer-ratio data.

In an implementation, determining of the control data may be based on the steady-state vehicle model comprising understeer gradient data (Ku) of the vehicle, wheelbase data (L) of the vehicle and road-wheel-angle data (rwa) of the vehicle and may be based on the formula:

$$\frac{rwa}{L + Ku * Vx^2}$$

whereby:
rwa is road-wheel-angle data;
L is wheelbase data;
Ku is understeer gradient data; and/or
Vx is vehicle speed data.

In an implementation, the method may comprise determining of a system steering failure data of the vehicle, which may be based on the at least one driver support system and/or driving assistance system; and the control data may comprise a failure data of the vehicle;
if the at least one driver support system and/or driving assistance system is running in failure modus,
then the failure data may comprise a failure value;
else the failure data may comprise a no failure value.

The driver support system and/or the driving assistance system may comprise a system that controls the steering of the vehicle. Further, the driver support system and/or the driving assistance system may comprise a system that may be responsible for travel of the vehicle.

In an implementation, the control data may be used to control the at least one driver support system of the vehicle and/or the at least one driving assistance system of the vehicle based on the failure data, in particular, if the failure data comprise a failure value. The control data may be used to control speed of the vehicle. Further, the control data may be used to control brakes of the vehicle. Furthermore, the control data may be used to control the power transmission to at least on wheel of the vehicle.

In an implementation, the method may comprise determining of the negotiating of a desired path of the vehicle, whereby determining may be based on a high/low curvature of the desired path of the vehicle and the steering angle data and/or the control data.

A further aspect of the present disclosure relates to a system for providing control data for at least one driver support system and/or driving assistance system of a vehicle for supporting the driving of the vehicle on a desired path through a curvature planning and steering, comprising:
a first obtaining unit for obtaining suspension data of the vehicle;
a second obtaining unit for obtaining vehicle data of the vehicle;
a third obtaining unit for obtaining vehicle driving sensor data of the vehicle;
a first determining unit for determining a steering angle data based on the suspension data, the vehicle data, and the vehicle driving sensor data; and
a second determining unit for determining the control data for at least one driver support system and/or driving support system based on the steering angle data and a curvature vehicle model.

The system may be coupled and/or set up to interact with at least one control unit of the vehicle. The system may be coupled and/or set up to receive failure values of at least one driver support system and/or driving assistance system.

In an implementation, the system may comprise a data providing unit for providing the control data for at least one driver support system and/or driving assistance system of a vehicle which is controlled based on the control data.

A further aspect of the present disclosure relates to a computer program element with instructions, which, when executed on a computing device of a computing environment, is configured to carry out the steps of the method as described above in the system as described above.

A further aspect of the present disclosure relates to a vehicle comprising the system as described above, whereby the system is implemented and configured to run the computer program element as described above and the computer program element is configured to carry out the steps of the method as described above, whereby the vehicle is configured to use a steer-by-torque vectoring method and/or a steer-by-break vectoring method.

BRIEF DESCRIPTION OF DRAWINGS

In the following, the disclosure is described exemplarily with reference to the enclosed figures, in which.

DETAILED DESCRIPTION

Figure 1:
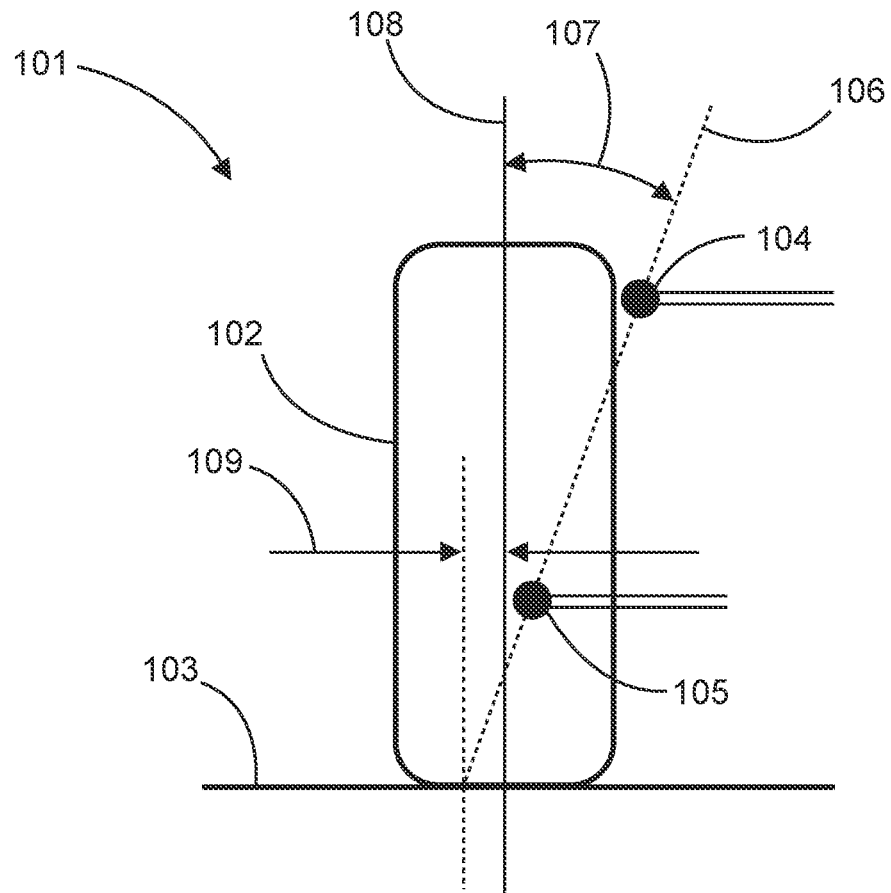
FIG. 1 is a schematic illustration of an example of a wheel suspension of a vehicle with the scrub radius of the wheel.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 shows a schematic illustration of a suspension 101 of a wheel 102 on a track 103. Whereby the suspension 101 comprises an upper joint 104 and a lower joint 105, which are capable to connect the wheel 102 to a vehicle, whereby the upper joint 104 and the lower joint 105 form a kingpin axis 106. The kingpin axis 106 is at a kingpin inclination 107 to a vertical axis 108 of a horizontal middle of the wheel 102.

Further, FIG. 1 shows a scrub radius axis 109 of the wheel 102, which describes a variance of a center of rotation of the wheel 102 with the vertical axis 108 to a contact patch of the wheel 102 at the scrub radius axis 109, whereby the center of rotation of the wheel 102 is in dependence of the kingpin inclination 107 to and the vertical axis of the wheel 102.

Figure 2:
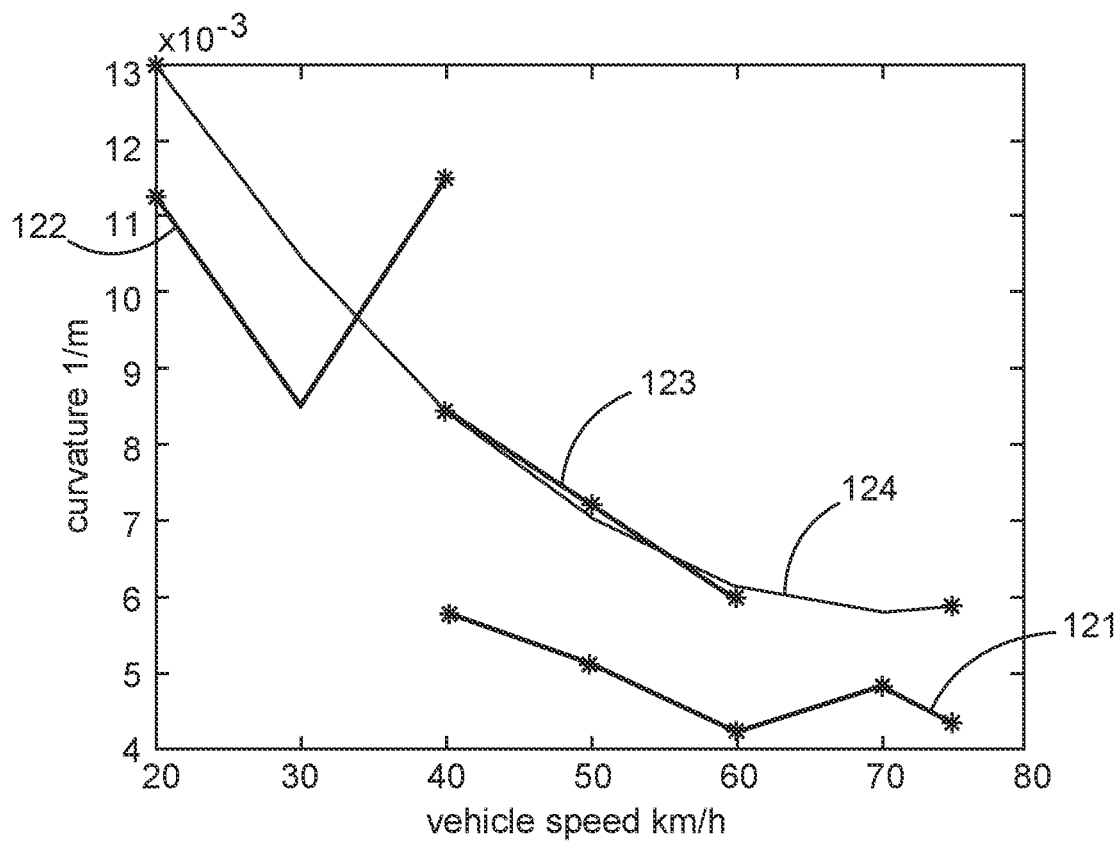
FIG. 2 is a schematic diagram of an example of a wheel torque between left and right side of a vehicle, while the vehicle is turning with different curvatures.

FIG. 2 shows a diagram which comprises a first axis, which represents curvature in 1 per meter [1/m], and a second axis, which represents vehicle speed in kilometer per hour [km/h]. The diagram shows the torque between the left and the right side of a vehicle in newton meter [Nm] depending on use of friction brakes and/or torque vectoring of a vehicle, whereby the wheels of the vehicle are not receiving steering commands from the steering wheel and/or a steering controlling unit of the vehicle.

The diagram comprises a first graph 121, which represents 500 [Nm] (−500 [Nm]), a second graph 122, which represents 700 [Nm] (−700 [Nm]), a third graph 123, which represents 800 [Nm] (−300, +500 [Nm]) and a fourth graph 124, which represents a curve fit for 800 [Nm]. The graphs each refer to the difference in wheel torque between left and right side on different vehicle speed values with different curvatures.

Figure 3:
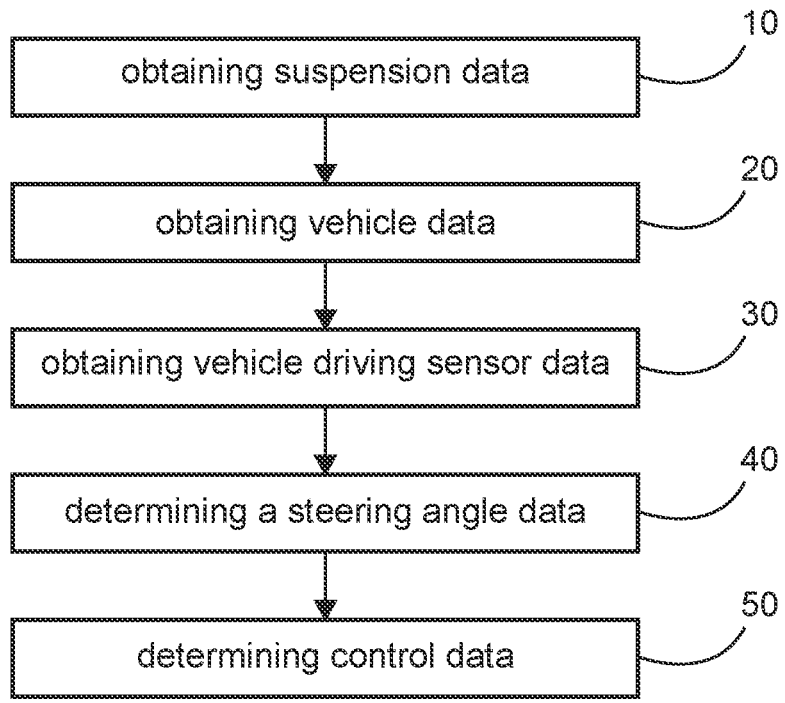
FIG. 3 is a schematic diagram of an example of a process of the disclosed method.

FIG. 3 shows a diagram of a process of the disclosed method, whereby the method comprises the steps of obtaining suspension data 10 of the vehicle, obtaining vehicle data 20 of the vehicle, obtaining vehicle driving sensor data 30 of the vehicle, determining a steering angle data 40 based on the suspension data, the vehicle data, and the vehicle driving sensor data and determining control data 50 for at least one driver support system and/or driving support system based on the steering angle data and a curvature vehicle model.

Figure 4:
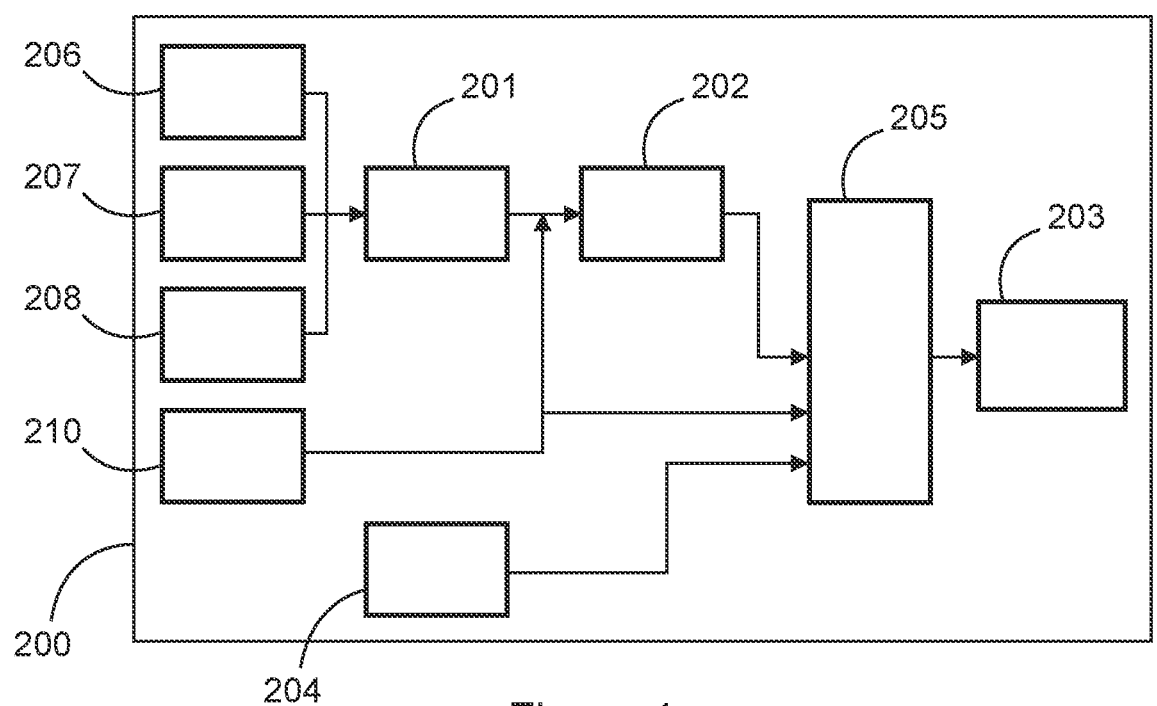
FIG. 4 is a schematic overview of an example of the disclosed system.

FIG. 4 shows a schematic overview of an example of a system 200 for monitoring the driver support system and/or driving assistance system regarding failure of a vehicle and for controlling the vehicle to use a determined curvature of a track ahead of the vehicle in case of a failure based on the disclosed method.

The system 200 comprises a first determining unit 201, a second determining unit 202, a data providing unit 203, a steering failure monitor unit 204, a switch unit 205, a first obtaining unit 206, a second obtaining unit 207 and third obtaining unit 208.

Further, the vehicle comprises a steering controlling unit 210 of the vehicle, which is configured to process steering commands from a steering wheel of the vehicle and/or from at least one driving assistance system of a vehicle for supporting the driving of the vehicle to provide steering data to steer the vehicle. The controlling unit 210 send the steering data to the switch unit 205.

The first determining unit 201 is capable to process movement data of the vehicle based on the first obtaining unit 206, the second obtaining unit 207 and the third obtaining unit 208 for a motion planning, whereby planning data of the motion planning of the first determining unit 201 is send to the second determining unit 202.

The second determining unit 202 is capable to process the motion planning data of the first determining unit 201, speed capability of the track ahead of the vehicle and an adapted speed for a re-motion planning as well as the steering data of the controlling unit 210 in order to follow a reference path of the vehicle. Whereby re-planning data of the re-motion planning of the second determining unit 201 is send to the switch unit 205.

Furthermore, a speed capability of the ahead track may be computed offline, for example with a look-up table for max speed dependent on road curvature. An adapted speed may be computed in order to follow the reference path. A re-planning of the path may be needed if for example, an unwanted too high deceleration is needed, the vehicle must stop at an appropriate/dangerous position, alternative routes are available; then an alternative route could be considered as better and be used. In other words, the task of the first determining unit 201 and the second determining unit 202 is to determine and provide tracks with smaller curvature of the planned path to the vehicle or slow down speed and find a safe stand-still position.

The switch unit 205 is capable to transmit the received steering data of the controlling unit 210 and/or re-planning data of the second determining unit 202 to the data providing unit 203. Thus, based on the steering data and/or the re-planning data, data providing unit 203 is able to transmit control data to at least one driver support system of the vehicle and/or for at least one driving assistance system of the vehicle for controlling the vehicle.

The steering failure monitor unit 204 is capable to control the switch unit 205 in dependence on a failure data, which indicates the function of at least one driver support system of the vehicle and/or for at least one driving assistance system of the vehicle. In case the failure data comprises a no failure value the steering data of the controlling unit 210 is directed to the data providing unit 203; or in case the failure data comprises a failure value the re-planning data of the second determining unit 202 is directed to the data providing unit 203.

In other words, as long as the steering is working, then the steering data will be used, but when the monitor detects steering failure, then the re-planning data will be used to apply brake or torque vectoring instead.

The data providing unit 203 comprises a lateral control unit and a longitudinal control unit, which are capable to control a steering of the vehicle and/or the speed of the vehicle. Further, the steering may control with the steering angle. Furthermore, the speed may be controlled with a steer-by-torque vectoring method and/or a steer-by-break vectoring method.

The re-motion planning may be needed if an unwanted too high deceleration is needed, the vehicle must stop at an appropriate/dangerous position and/or an alternative route is available. Whereby a main task of the re-planning may to follow a smaller curvature of the re-planed path, slow down speed and/or find a safe stand-still position.

Figure 5:
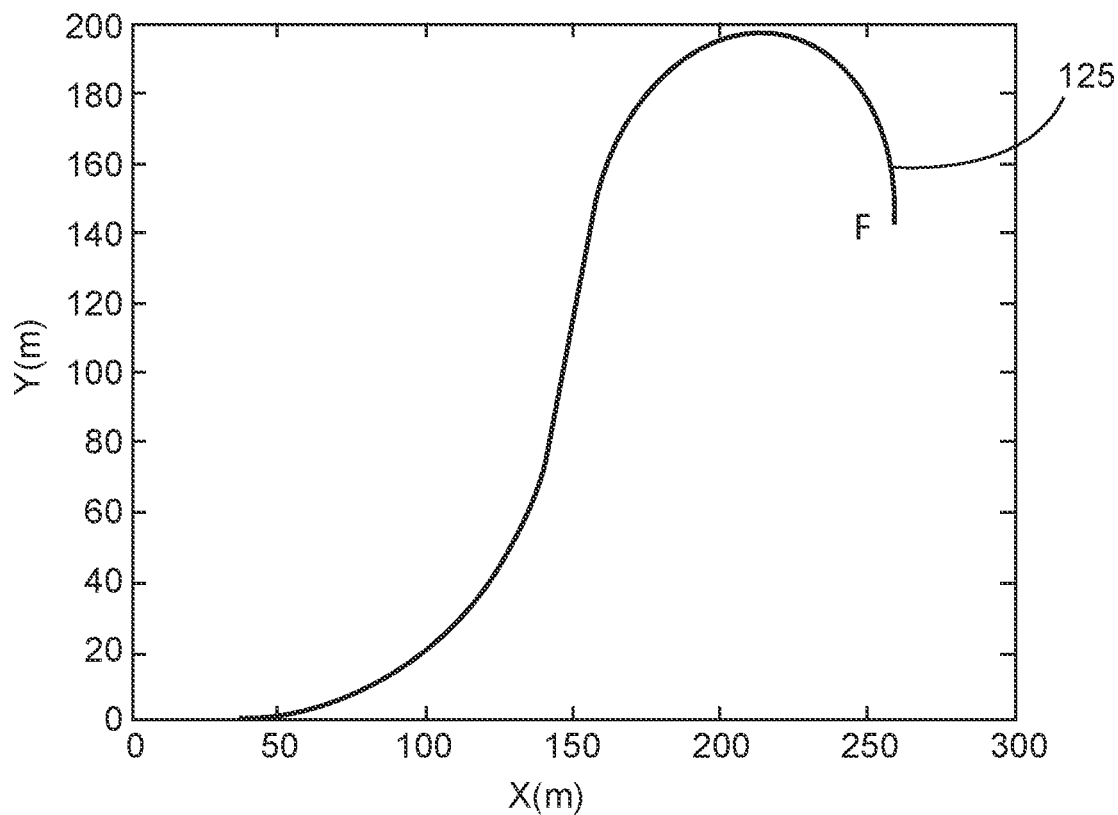
FIG. 5 is a schematic diagram of an example of a vehicle route.

FIG. 5 shows a diagram which comprises a first axis, which represents Y in meter [m], and a second axis, which represents X in meter [m]. The diagram shows a position (Y, X) of the vehicle on a track depending the Y and the X parameter as a position on the track.

The diagram comprises a fifth graph 125, which represents a travel of the vehicle at a fixed vehicle speed on a desired track of the vehicle, whereby the desired track of the vehicle being from Y=0 and X=0 to point F.

Figure 6:
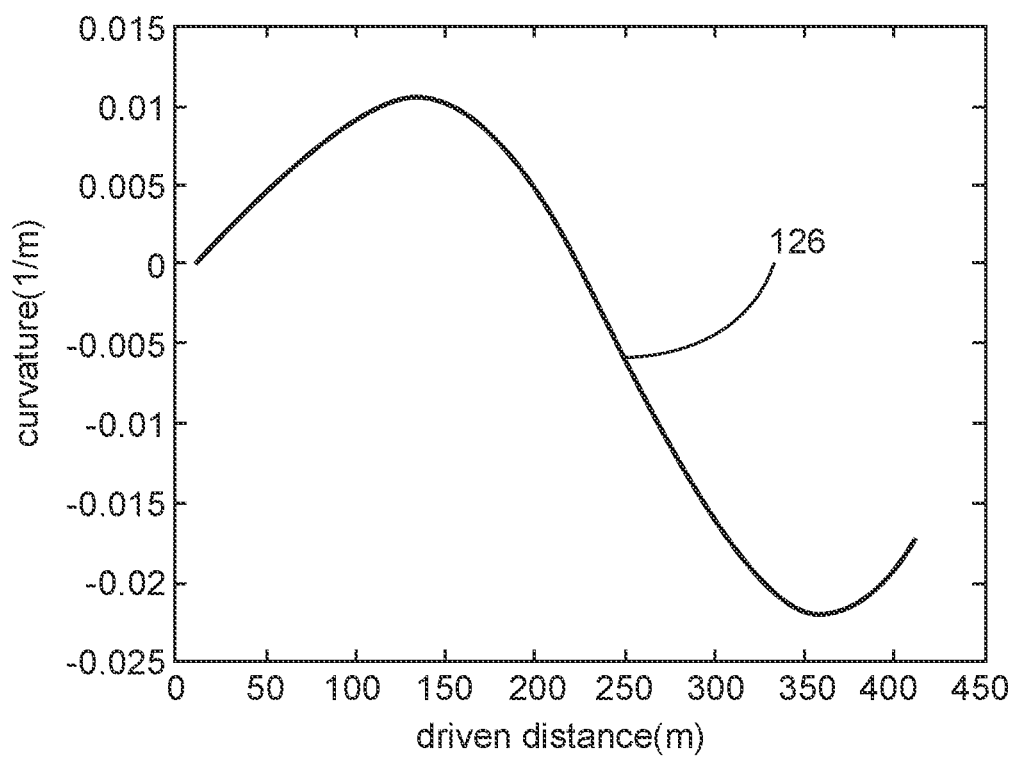
FIG. 6 is a schematic diagram of an example of a vehicle curvature regarding FIG. 5.

FIG. 6 shows a diagram which comprises a first axis, which represents curvature in 1 per meter [1/m], and a second axis, which represents driven distance in meter [m]. The diagram comprises a sixth graph 126, which shows a curvature driven by the vehicle based on the position of the vehicle of FIG. 5.

Figure 7:
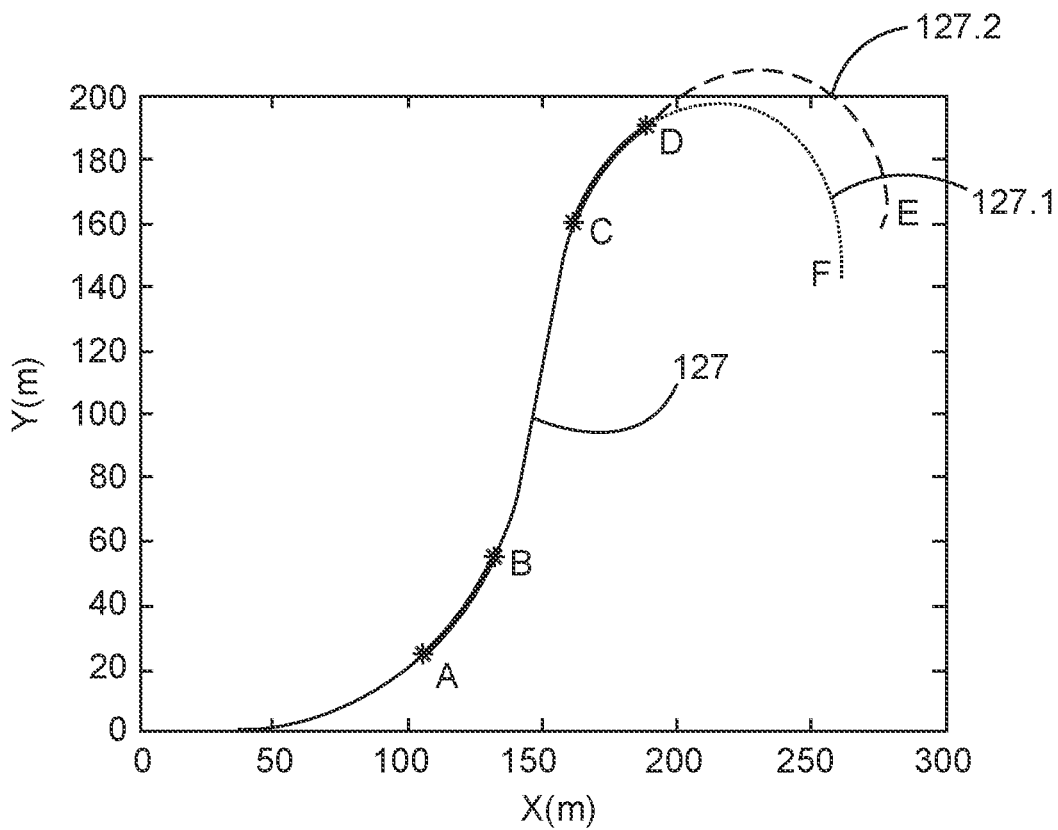
FIG. 7 is a schematic diagram of an example of a vehicle route with steering the wheels of a vehicle regarding to the disclosed method.

FIG. 7 shows a diagram which comprises a first axis, which represents Y in meter [m], and a second axis, which represents X in meter [m]. The diagram shows a position of the vehicle on a track depending the Y and the X parameter as a position on the track.

The diagram comprises a seventh graph 127, which represents a travel of the vehicle on a desired track of the vehicle, whereby the wheels of the vehicle are not receiving steering commands from the steering wheel and/or a steering controlling unit of the vehicle and the desired track of the vehicle should be from Y=0 and X=0 to point F. In order to follow the desired curvature, the speed of the vehicle is reduced in segments A to B and C to D regarding to the disclosed method, whereby the reduction of speed causes the vehicle to corner controlled with a steer-by-torque vectoring method and/or a steer-by-break vectoring method.

A seventh graph first curvature 127.1 shows the track to the desired point F, whereby the vehicle would not be able to corner enough to drive through the segment of point D to point F, such that it would be stopped in according to the disclosed method. For example, it would be stopped at latest before reaching point D, at a safe location for the vehicle to stop and/or before the vehicle departs from a road.

A seventh graph second curvature 127.2 shows a calculated curvature from point D to E, as an alternative to the seventh graph first curvature 127.1, whereby the vehicle is able to corner enough to drive through the seventh graph second curvature 127.2 to drive to point E.

Thereby the seventh graph second curvature 127.2 would be chosen if for example, the curvature of the seventh graph first curvature 127.1 is too large, there is a safe zone attainable along the curvature of the seventh graph second curvature 127.2 to the final stop point E instead, it is unsafe to drive the seventh graph first curvature 127.1 and/or on the seventh graph first curvature 127.1 isn't a safe location for the vehicle to stop.

Figure 8:
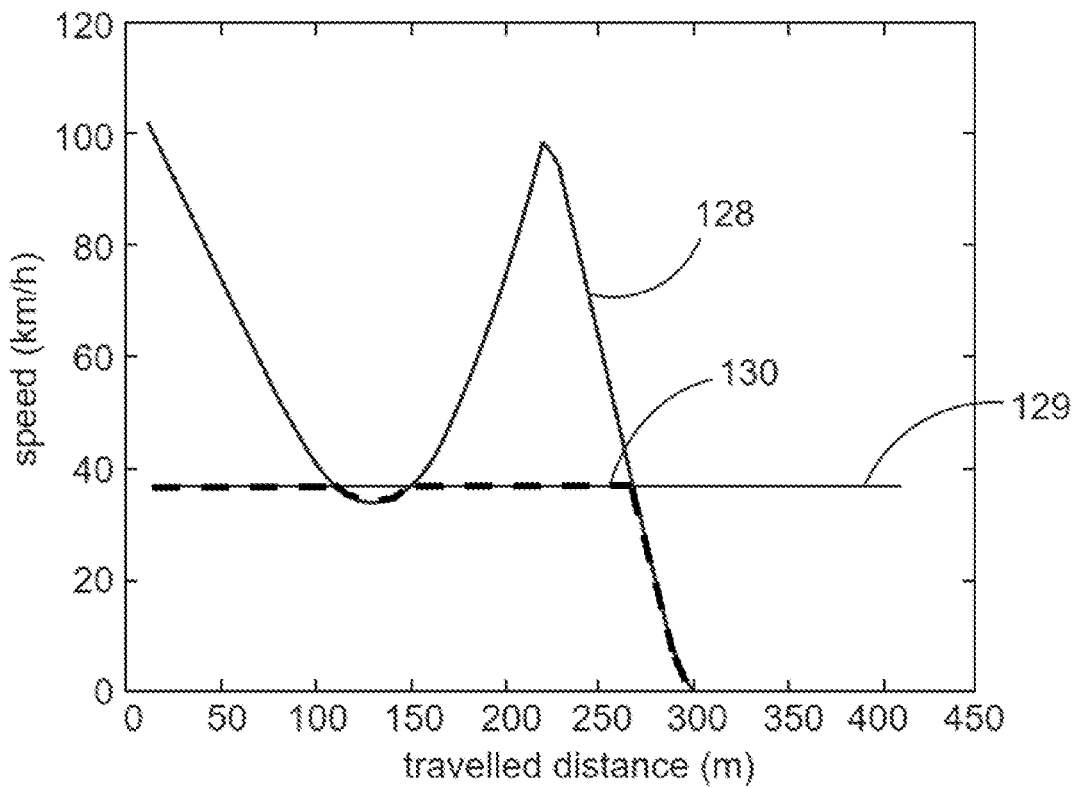
FIG. 8 is a schematic diagram of an example of a vehicle driven speed regarding to FIG. 7.

FIG. 8 shows a diagram which comprises a first axis, which vehicle speed in kilometer per hour [km/h], and a second axis, which represents travelled distance in meter [m].

The diagram comprises an eighth graph 128, which shows the speed limits of the track on the actual travel of the vehicle based on the position of the vehicle of FIG. 7. Further a ninth graph 129, which shows the desired speed of the vehicle. And a tenth graph 130, which shows the driven speed of the vehicle on the actual travel of the vehicle based on the position of the vehicle of FIG. 5 in dependence of the eighth graph 128 and the ninth graph 129.

Further the eighth graph 128 may be determined for a track ahead of the vehicle, so that the vehicle can be controlled regarding the eighth graph 128 to may travel a desired track.

Figure 9:
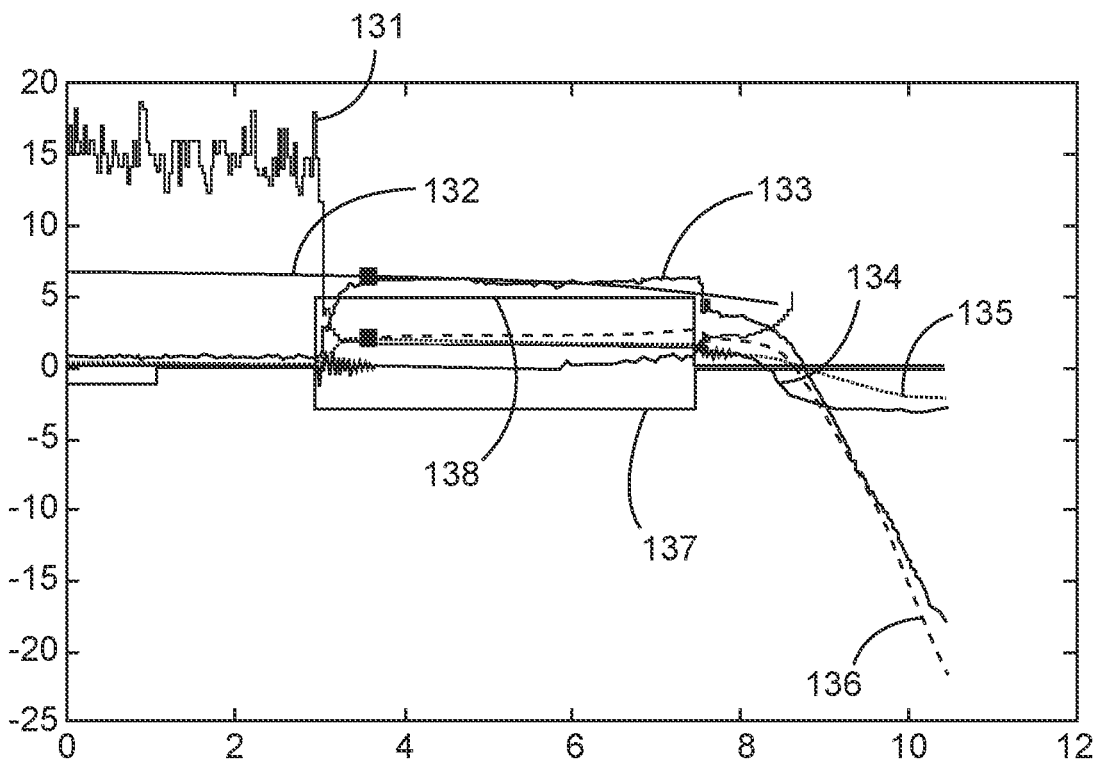
FIG. 9 is a schematic diagram of an example of a time response of a vehicle for braking and/or torque vectoring.

FIG. 9 shows a schematic example of vehicle testing results about the steering capability (e.g. steering angle, curvature/turning radius, lateral acceleration) by torque vectoring comprising a first axis, which represents different values in dependence to respective graph, and a second axis, which represents time in seconds [s]. The diagram comprises an eleventh graph 131, which shows a turning radius/100 in meter [m]", a twelfth graph 132, which shows a vehicle speed/10 in kilometer per hour [km/h], a thirteenth graph 133, which shows a yaw rate of the wheel (yawrate) in degree per second [deg/s], a fourteenth graph 134, which shows a steering-wheel torque of the vehicle (SteerWhlTq) in newton meter [Nm], a fifteenth graph 135, which shows a vehicle lateral acceleration in meter per square second [m/s$^2$], a sixteenth graph 136, which shows a steering wheel angle *10 in radiant [rad], a seventeenth graph 137, which shows a wheel torque at front left wheel/100 in newton meter [Nm], and an eighteenth graph 138, which shows a wheel torque at front right torque/100 in newton meter [Nm].

The diagram shows the time delay of the determining of different driving parameters of the vehicle and the time delay of different control parameters of the steering of the vehicle regarding to their impact to the control of the vehicle.

Other variations to the disclosed example can be understood and effected by those skilled in the art in practicing the claimed subject matter, from the study of the drawings, the disclosure, and the appended claims. In particular, respective parts/functions of the respective example described above may also be combined with each other. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 obtaining suspension data
20 obtaining vehicle data
30 obtaining vehicle driving sensor data
40 determining a steering angle data
50 determining control data
101 suspension
102 wheel
103 track
104 upper joint
105 lower joint
106 kingpin axis
107 kingpin inclination
108 vertical axis
109 scrub radius axis
121 first graph
122 second graph
123 third graph
124 fourth graph
125 fifth graph
126 sixth graph
127 seventh graph
127.1 seventh graph first curvature
127.2 seventh graph second curvature 128 eighth graph
129 ninth graph
130 tenth graph
131 eleventh graph
132 twelfth graph
133 thirteenth graph
134 fourteenth graph
135 fifteenth graph
136 sixteenth graph
137 seventeenth graph
138 eighteenth graph
200 system
201 first determining unit
202 second determining unit
203 data providing unit
204 steering failure monitor unit
205 switch unit
206 first obtaining unit
207 second obtaining unit
208 third obtaining unit
210 steering controlling unit of the vehicle

What is claimed is:

1. A computer-implemented method, comprising:
   detecting, by a driver assistance system of a vehicle, a failure of a steering system of the vehicle while driving on a desired path;
   controlling, by the at least one processor of the driver assistance system, steering of the vehicle during the failure of a steering system, wherein the controlling comprises:
   obtaining suspension data of the vehicle;
   obtaining vehicle data of the vehicle;
   obtaining vehicle driving sensor data of the vehicle;
   determining steering angle data based on the suspension data, the vehicle data, and the vehicle driving sensor data; and
   determining control data for controlling the steering of the vehicle on the desired path based on the steering angle data and a curvature vehicle model, wherein the control data comprises maximum speed data defining a maximum speed during the failure of the steering system at which the vehicle can follow a curvature of the desired path.

2. The computer-implemented method of claim 1, wherein the suspension data comprises at least one of wheel scrub radius data of at least one wheel of the vehicle, wheel torque data of the at least one wheel of the vehicle, or cornering stiffness data of at least one axis.

3. The computer-implemented method of claim 1, wherein the suspension data comprises at least one of wheel scrub radius data of at least one wheel of the vehicle, wheel torque data of the at least one wheel of the vehicle, or cornering stiffness data of a front axis of the vehicle.

4. The computer-implemented method of claim 1, wherein the vehicle data comprises at least one of wheel data of at least one wheel of the vehicle, caster trail data of the vehicle, or center of gravity data of the vehicle.

5. The computer-implemented method of claim 1, wherein the vehicle driving sensor data comprises at least one of vehicle speed data of the vehicle, yaw rate data of the vehicle, or vehicle steer-ratio data of the vehicle.

6. The computer-implemented method of claim 1, wherein the control data further comprises at least one of a steer-by-torque vectoring value to use a steer-by-torque vectoring method for the steering of the vehicle, or a steer-by-brake vectoring value to use a steer-by-brake vectoring method for the steering of the vehicle.

7. The computer-implemented method of claim 1, wherein determining the steering angle data, resulting from differential torque of the vehicle, is based on:

$$\frac{\frac{R_{scrub} * DiffTq}{WhlRd}}{CornrgStfnFrnt * R_{caster}} + \frac{Lf * \text{yaw rate}}{Vx * \text{steer ratio}}$$

wherein
   Rscrub is wheel scrub radius data;
   DiffTq is wheel torque data;
   CornrgStfnFrnt is cornering stiffness data;
   WhlRd is wheel data;
   Rcaster is caster trail data;
   Lf is center of gravity data;
   Vx is vehicle speed data;
   yawrate is yaw rate data; and
   steeratio is vehicle steer-ratio data.

8. The computer-implemented method of claim 1, wherein determining the control data is based on steady-state vehicle model comprising understeer gradient data of the vehicle, wheelbase data of the vehicle, and road-wheel-angle data of the vehicle, and is based on:

$$\frac{rwa}{L + Ku * Vx^2}$$

wherein
   rwa is the road-wheel-angle data;
   L is the wheelbase data;
   Ku is the understeer gradient data; and
   Vx is vehicle speed data.

9. The computer-implemented method of claim 1,
   wherein the control data further comprises failure data of the vehicle,
   wherein the driving assistance system is running in failure modus,
   wherein the failure data comprises a failure value, and
   wherein the failure data comprise a no failure value.

10. The computer-implemented method of claim 9, wherein the control data is used to control the steering of the vehicle based on the failure data.

11. The computer-implemented method of claim 9, wherein the control data is used to control the steering of the vehicle based on the failure data, in particular if the failure data comprises a failure value.

12. The computer-implemented method of claim 1,
    wherein the control data further comprises failure data of the vehicle,
    wherein the driving assistance system is not running in failure modus, and
    wherein the failure data comprises a no failure value.

13. A driver support system of a vehicle, the driver support system comprising:
    a computing device configured to execute at least one of computer program element that:
    detect a failure of a steering system of the vehicle while driving on a desired path;
    control steering of the vehicle during the failure of a steering system, wherein the controlling comprises:
    obtaining suspension data of the vehicle;
    obtaining vehicle data of the vehicle;
    obtaining vehicle driving sensor data of the vehicle;

determining steering angle data based on the suspension data, the vehicle data, and the vehicle driving sensor data; and determining control data for controlling the steering of the vehicle on the desired path based on the steering angle data and a curvature vehicle model, wherein the control data comprises maximum speed data defining a maximum speed during the failure of the steering system at which the vehicle can follow a curvature of the desired path.

14. The system of claim 13, wherein the suspension data comprises at least one of wheel scrub radius data of at least one wheel of the vehicle, wheel torque data of the at least one wheel of the vehicle, or cornering stiffness data of a front axis of the vehicle.

15. The system of claim 13, wherein the vehicle data comprises at least one of wheel data of at least one wheel of the vehicle, caster trail data of the vehicle, or center of gravity data of the vehicle.

16. The system of claim 13, wherein the vehicle driving sensor data comprises at least one of vehicle speed data of the vehicle, yaw rate data of the vehicle, or vehicle steer-ratio data of the vehicle.

17. The system of claim 13, wherein the control data further comprises at least one of a steer-by-torque vectoring value to use a steer-by-torque vectoring method for the steering of the vehicle, or a steer-by-brake vectoring value to use a steer-by-brake vectoring method for the steering of the vehicle.

18. A vehicle, comprising:
a driving assistance system, comprising:
a computing device configured to execute at least one of computer program element that:
detect a failure of a steering system of the vehicle while driving on a desired path;
control steering of the vehicle during the failure of a steering system, wherein the controlling comprises:
obtaining suspension data of the vehicle;
obtaining vehicle data of the vehicle;
obtaining vehicle driving sensor data of the vehicle;
determining steering angle data based on the suspension data, the vehicle data, and the vehicle driving sensor data; and
determining control data for controlling the steering of the vehicle on the desired path based on the steering angle data and a curvature vehicle model, wherein the control data comprises maximum speed data defining a maximum speed during the failure of the steering system at which the vehicle can follow a curvature of the desired path.

19. The vehicle of claim 18, wherein the suspension data comprises at least one of wheel scrub radius data of at least one wheel of the vehicle, wheel torque data of the at least one wheel of the vehicle, or cornering stiffness data of a front axis of the vehicle.

20. The vehicle of claim 18, wherein the vehicle data comprises at least one of wheel data of at least one wheel of the vehicle, caster trail data of the vehicle, or center of gravity data of the vehicle.

21. The vehicle of claim 18, wherein the vehicle driving sensor data comprises at least one of vehicle speed data of the vehicle, yaw rate data of the vehicle, or vehicle steer-ratio data of the vehicle.

22. The vehicle of claim 18, wherein the control data further comprises at least one of a steer-by-torque vectoring value to use a steer-by-torque vectoring method for the steering of the vehicle, or a steer-by-brake vectoring value to use a steer-by-brake vectoring method for the steering of the vehicle.

23. The vehicle of claim 18,
wherein the control data further comprises failure data of the vehicle, and
wherein the driving assistance system is running in failure modus.

* * * * *